Figure 5:
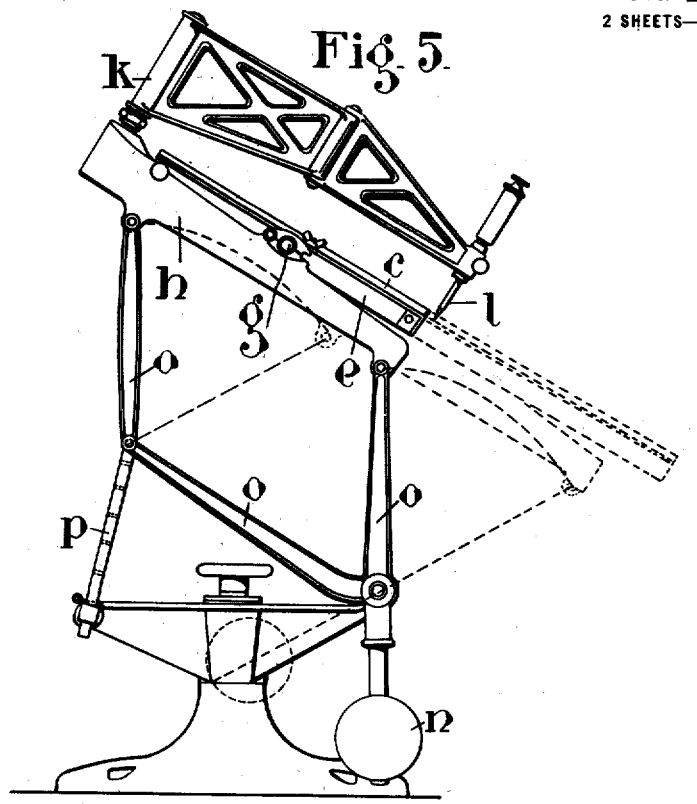

K. WENSCHOW.
PROCESS OF FORMING RELIEF MAPS, PICTURES, AND THE LIKE.
APPLICATION FILED JULY 14, 1919.
1,393,255.
Patented Oct. 11, 1921.
2 SHEETS—SHEET 1.
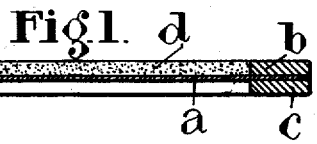
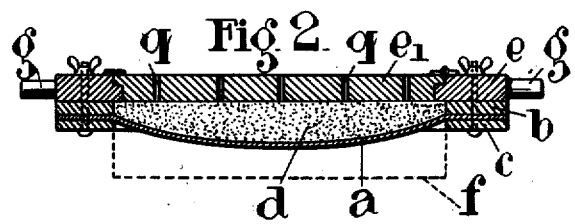
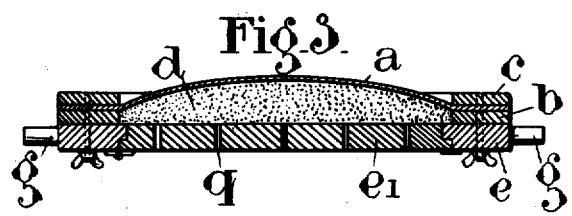
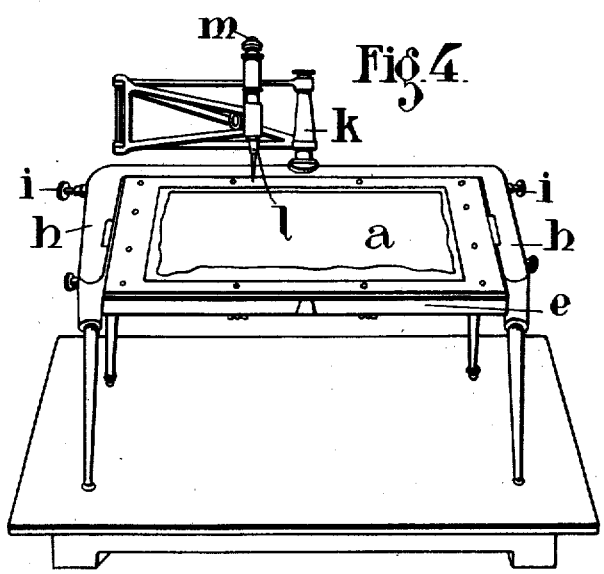
Inventor:
Karl Wenschow
By [signature]
Attorney.

K. WENSCHOW.
PROCESS OF FORMING RELIEF MAPS, PICTURES, AND THE LIKE.
APPLICATION FILED JULY 14, 1919.

1,393,255.

Patented Oct. 11, 1921.
2 SHEETS—SHEET 2.

Inventor:
Karl Wenschow

UNITED STATES PATENT OFFICE.

KARL WENSCHOW, OF BERLIN-LICHTERFELDE, GERMANY, ASSIGNOR TO ALBERT DEICHMANN, OF COLOGNE, GERMANY.

PROCESS OF FORMING RELIEF MAPS, PICTURES, AND THE LIKE.

1,393,255.  Specification of Letters Patent.  Patented Oct. 11, 1921.

Application filed July 14, 1919. Serial No. 310,872.

*To all whom it may concern:*

Be it known that I, KARL WENSCHOW, a citizen of Germany, residing at Berlin-Lichterfelde, Germany, have invented certain new and useful Improvements in Processes of Forming Relief Maps, Pictures, and the like, (for which I have filed applications in Germany February 14, 1918; Austria April 24, 1918; Turkey May 25, 1918; Hungary April 26, 1918,) of which the following is a specification.

My invention relates to the transformation of drawings, etchings, paintings or other patterns of any kind on paper, silk, linen or other suitable material into reliefs and its particular object is to produce at low cost and with a minimum of labor true reliefs from such patterns, either singly or on a large scale. My invention is particularly applicable to the production of relief maps and plans.

The novel process embodying my invention substantially consists in fixing the pattern in a frame in such a manner that it is spread out therein. The pattern is then rendered elastic in some suitable way, such as by impregnating it with a suitable liquid such as for instance water. I may however already impregnate the pattern before fixing it to the frame. Upon the pattern thus treated and fixed a plastic mass is then poured so as to cover it and to fill the spaces inclosed by the frame. The plastic mass should be tough and sandy and should allow of being modeled before hardening. I prefer using for this purpose a mixture of ground slate, china-clay, cakum, glue and water. The pattern covered with the plastic mass is then left to itself, the load placed on it causing it to bag so as to assume the form of a cushion. A cover is now placed on the frame, so as to inclose the plastic mass between the frame and the pattern. I now prefer turning the whole around so that the pattern is on top, and I then proceed with the embossing of the pattern by treating the pattern with suitable tools or matrices from above so as to transform it into a relief.

Instead of turning around the frame and the pattern with the mass inclosed between them I may equally well place underneath the pattern loaded with the plastic mass a matrix approaching as nearly as possible the form of the relief to be produced. The pressure exerted by the plastic mass upon the pattern suitably prepared causes this latter to stretch to such an extent that it will snugly fit into all excavations of the matrix. The well-known tendency of paper of elongating more on one side than on the other is counterbalanced by the elastic pressure exerted by the plastic mass so that the dimensions of the pattern remain unaltered. This is of particular importance in the case of large sized patterns and quite especially relief maps and the like.

In order to expedite the bagging of the paper, fabric or the like forming the pattern I may also distribute the plastic mass in such a manner that greater quantities of it are placed on such portions where strongly marked reliefs shall appear. In order to facilitate the transformation of the pattern into its final form I may also distribute the liquid used for impregnating it in such a manner, that those portions where strongly marked reliefs are to appear are impregnated with greater quantities of the liquid while such portions as are intended to appear more or less even, receive little or no impregnation at all. By proceeding in this manner I can direct the embossing of the pattern in any desired manner. The impregnation can be carried out advantageously by aid of stencils corresponding generally to the form of the surfaces to be impregnated, such stencils being placed on the back of the pattern and the liquid being then applied either in the form of a spray or by means of a brush. I may however also apply the liquid to the upper surface of the pattern, even after the same has already partly been embossed.

Besides impregnating the pattern in certain places I prefer embossing it either with the hands or with suitable tools from the reverse of the pattern, such treatment being effected with or without the aid of a thin layer of plastic mass. By thus treating it I cause the pattern to stretch to a greater extent in these places than in others. The treatment just described may also be carried out with the aid of a matrix placed underneath the pattern. Instead of a matrix I may also employ a pad of suitable material, such as moistened wadding, plastic mass or the like, in order to prevent the pattern from tearing.

In order to be able to exactly follow the lines of the drawing or the like although the pattern is hanging face downward and is moreover covered with a thin layer of plastic mass I prefer placing on the mass a copy of the drawing to be embossed. If the pattern is locally prepared and treated in the manner described above, the bagging under the influence of the plastic mass will already cause the pattern to be transformed into a relief approaching in general the final form, so that the subsequent embossing by hand or by aid of tools is greatly facilitated.

In order to carry this process out on a big scale the whole frame and matrix may be placed in a press, the mechanical pressure thus applied to the pattern and the plastic mass causing the former to enter into every excavation of the matrix.

In the drawings affixed to this specification and forming part thereof a device adapted to facilitate the carrying out of the process described is illustrated, Figure 1 being a vertical section of the frame with the pattern fixed therein and some of the plastic mass placed on top of the pattern, while Fig. 2 is a section of a frame and the cover inserted therein after the plastic mass has exerted its pressure upon the pattern, Fig. 3 showing the same parts in an inverted position. Fig. 4 is a perspective view of a standard adapted to receive the frame shown in Figs. 1 to 3, while Fig. 5 is a side elevation and Fig. 6 a plan of an adjustable table for carrying the frame and the tools used in embossing the pattern.

Referring to the drawings $a$ is the pattern and $b$ and $c$ are the halves of the frame used for holding between them the edges of the pattern placed face downward, the pattern having been impregnated either before being fixed in the frame or thereafter. $d$ is a layer of plastic mass placed upon the back surface of the pattern stretched out in the frame. The frame on being subjected to the pressure exerted by the weight of the plastic mass will bag so as to assume the form shown in Fig. 2. A cover is then placed on the frame and the plastic mass, such cover preferably consisting of a frame $e$ and a plate $e_1$ hinged to said frame so as to allow more of the plastic mass to be filled in after the whole cover has been fixed in place by aid of the screw bolts shown in Figs. 2 and 3. Perforations are formed in the plate $e_1$, thus allowing any plastic mass in excess to escape. The whole frame may then be turned around as shown in Fig. 3, the pattern now lying on top in an upright position. It is now easy to emboss the pattern and the plastic mass by means of tools and matrices so as to produce the desired relief.

In order to prevent the pattern from bagging too much in some places, especially where large sized patterns are concerned a matrix $f$ as shown in dotted lines in Fig. 2 may be placed underneath the frame and pattern, such matrix being a more or less true cast of the relief to be produced. The matrix may also be turned around along with the frame. In order to facilitate the handling and turning around of the frame, pivots $g$ may be provided, and the frame may be suspended by aid of these pivots in a standard frame $h$ such as illustrated in Fig. 4, spring actuated bolts $i$ serving for holding the frame in one or the other position.

In embossing the pattern $a$ I may employ a measuring and embossing appliance $k$ allowing various tools $l$ to be inserted therein and to be adjusted according to requirements. The vertical adjusting of the tools may be carried out with great accuracy by aid of a micrometrical screw $m$. A device of the kind is especially useful in the production of relief maps for controlling the elevation of contours of equal altitude.

Figure 6:
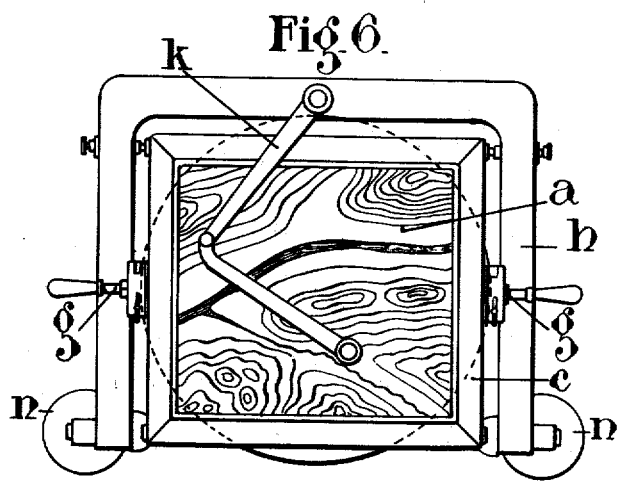

Figs. 5 and 6 illustrate an adjustable frame or table to be used in embossing the pattern. The frame and cover $c, e$ are suspended in the table frame $h$ by aid of the pivots $g$, a movable parallelogram formed by arms $o$ and provided with counterweights $n$ serving to vary the position of the table and frame, which may be fixed at will by means of the brace $p$.

The cover $e$ $e_1$ instead of presenting a flat surface may as well have the form of a more or less true patrix adapted to press the plastic mass and pattern into shape, such patrix being employed either by itself or in combination with a corresponding matrix placed underneath the pattern. After a pattern has been transformed into a relief in the manner described and the plastic mass has hardened, it may be used as a patrix for producing a number of matrices therefrom by a galvanoplastic process or by casting in any other suitable manner. The matrices thus produced may then be employed in carrying out once more the process described by placing them underneath the pattern, as shown in Fig. 2 or on top of it. This is especially useful in manufacturing reliefs and quite especially relief maps on a big scale. In such a case the entire frame system and matrix may be placed in a suitable press and the pattern and plastic mass may then be forced into the matrix by mechanical pressure, the dies of the press acting either from above or from below according to whether the frame and pattern are in the position shown in Fig. 2 or Fig. 3. In the former case the lower plate $e_1$ and frame $e$ may be dispensed with altogether and the die of the press may replace it.

The term " pattern " as used in this specification and the claims affixed to it is intended to comprise the drawing, painting, etching, print or other reproduction and the support carrying it and consisting of paper, fabric or any other suitable material.

I claim:

1. The process of forming relief maps, etc., which consists in mounting the pattern in a frame, moistening it to render it stretchable, pouring a plastic mass on the back of the pattern, and molding the stretched pattern according to the image thereon.

2. The process of forming relief maps, etc., which consists in clamping the edges of the moistened pattern in a frame, applying a plastic mass to the back of the pattern to cause it to sag, attaching a cover to the frame on top of the plastic mass, inverting the frame, and modeling the face of the pattern.

3. The process of forming relief maps, etc., which consists in clamping the edges of the moistened pattern in a frame, casting a plastic mass within the frame on the back of the pattern, thereby causing the latter to bulge outwardly, limiting the extent of such bulging by a matrix placed beneath the frame, placing a cover on the back of the plastic mass, inverting the frame, and modeling the face of the stretched pattern.

4. The process of forming relief maps, etc., which consists in clamping the pattern by its edges in a frame, moistening the pattern unequally so that it will stretch more in certain places than in others, filling the frame above the pattern with a plastic mass which causes the pattern to stretch and sag, attaching a cover to the frame back of the plastic mass, inverting the frame, and modeling the face of the pattern according to the image thereon.

5. The process of forming relief maps, etc., which consists in clamping the moistened pattern by its edges in a frame, placing a matrix of the pattern beneath the frame, filling in the frame with a plastic mass on the back of the pattern, and applying pressure on top of the plastic mass to force the pattern into the matrix.

6. The process of forming relief maps, etc., which consists in clamping the edges of a pattern in a frame, moistening the pattern especially at those places which are to have the highest relief, pouring a plastic mass on the back of the pattern to cause it to sag, applying pressure to the back of the plastic mass, inverting the frame, and embossing the face of the stretched pattern.

In testimony whereof I affix my signature.

KARL WENSCHOW.